United States Patent [19]

Kanagawa et al.

[11] Patent Number: 4,755,569

[45] Date of Patent: Jul. 5, 1988

[54] THERMOSETTING RESIN COMPOSITION COMPRISING A PARTLY ALLYLATED NOVOLAC EPOXY RESIN AND BISMALEIMIDE

[75] Inventors: Shuichi Kanagawa, Niihama; Shigeo Hozumi, Minoo; Kunimasa Kamio, Suita, all of Japan

[73] Assignee: Sumitomo Chemical Company, Limited, Osaka, Japan

[21] Appl. No.: 20,740

[22] Filed: Mar. 2, 1987

[30] Foreign Application Priority Data

Mar. 7, 1986 [JP] Japan .................................. 61-50942

[51] Int. Cl.$^4$ ........................... C08G 8/30; C08G 8/36
[52] U.S. Cl. .................................. 525/502; 525/504; 525/507
[58] Field of Search ...................... 525/502, 504, 507

[56] References Cited

U.S. PATENT DOCUMENTS

| 4,127,615 | 10/1978 | Zahir | 525/502 |
| 4,130,600 | 12/1978 | Zahir | 525/504 |
| 4,632,966 | 12/1986 | Kanagawa | 525/504 |

Primary Examiner—Earl Nielsen
Assistant Examiner—Frederick Krass
Attorney, Agent, or Firm—Stevens, Davis, Miller & Mosher

[57] ABSTRACT

A thermosetting resin composition comprising (A) a phenol novolac resin, some of the hydroxyl groups of which have been allyl-etherified and the other hydroxyl groups having added thereto a compound having one or more epoxy groups and (B) a polymaleimide compound having two or more maleimide groups in the molecule.

7 Claims, No Drawings

THERMOSETTING RESIN COMPOSITION COMPRISING A PARTLY ALLYLATED NOVOLAC EPOXY RESIN AND BISMALEIMIDE

BACKGROUND OF THE INVENTION

1. Field of the Invention

The present invention relates to a thermosetting resin composition, and more particularly to a thermosetting resin composition excellent in processability, heat resistance and adhesive property.

2. Description of the Prior Art

Thermosetting resins are used as materials for casting, impregnation, lamination and molding in the fields of electrical insulation, construction, etc. In these fields, there is a current tendency that the conditions under which these materials are used become more and more severe. Particularly, an increasing importance is being attached to heat resistance of material.

Hitherto, thermosetting polyimide resin and heat resistance epoxy resin have been used for such purposes. Or, as a material capable of replacing them, there was proposed in Japanese Patent Kokai (Laid-Open) No. 154,897/77 a thermosetting mixture comprising a polyimide, an allyl group containing epoxy compound having a special structure and a curing agent.

However, polyimide resin is disadvantageous in that its processing requires a longterm heating at a high temperature, and it is insufficient in adhesive property. Although epoxy resin having an improved heat resistance is excellent in processability and adhesive property, it is also disadvantageous in that it is insufficient in the high-class heat resistance, i.e. mechanical and electrical properties at high temperature, and heat degradation property for long term.

Further, an allyl group-containing epoxy compound used in the thermosetting mixture disclosed in Japanese Patent Kokai (Laid-Open) No. 154,897/77 was prepared by subjecting an allyl ether compound to Claisen rearrangement and then epoxidizing the rearranged product, from which a uniform cured product is difficult to prepare probably because the nucleus-substituting allyl group and epoxy group are located on the ortho positions of one aromatic ring. Particularly in the case of novolac type, this type of composition was inferior in physical property such as electrical insulating property and heat resistance of cured product probably because some of these groups are apt to remain unreacted.

Considering the above-mentioned background, the present inventors conducted earnest studies to find a resin composition having excellent processability, heat resistance and adhesive property, and found that a resin composition comprising a specified resin and a polymaleimide compound is suitable for the above mentioned purpose.

Based on the findings, the present invention was accomplished.

According to the present invention, there is provided a thermosetting resin composition comprising (A) phenol novolac resin some of the hydroxyl groups of which have been allyl-etherified and the other hydroxyl groups have added thereto a compound having one or more epoxy group(s) and (B) a polymaleimide compound having two or more maleimide groups in the molecule.

DETAILED DESCRIPTION OF THE INVENTION

A phenolic novolac resin (A) used in the present invention can be produced by condensing in known manner at least one unsubstituted or substituted phenol having alkyl group, alkenyl group, aryl group, aralkyl group or halogen atom as substituent, with an aldehyde compound such as formaldehyde, furfural, acrolein, glyoxal and the like to form a novolac resin usually having a mean nuclei number of 2 to 15, followed by reacting the latter with an allyl halide such as allyl chloride, allyl bromide, allyl iodide and the like and with a compound having one or more epoxy-group(s) in one molecule in known manner.

Concrete examples of the substituted phenol used in the above mentioned condensation reaction include cresol, ethylphenol, isopropylphenol, butylphenol, octylphenol, nonylphenol, vinylphenol, isopropenylphenol, phenylphenol, benzylphenol, chlorophenol, bromophenol, xylenol, methylbutylphenol, methoxyphenol, ethoxyphenol, α-methylbenzylphenol, β-phenylethylphenol, dihydroxybenzene, their isomers, bisphenol A and the like.

As the method of the reaction, there can be referred to (I) a method comprising subjecting a novolac resin and an allyl halide to dehydrohalogenation to allyl-etherify some of the hydroxy groups of the novolac resin followed by adding an epoxy compound to the residual hydroxyl groups, a method (II) comprising adding an epoxy compound to some of the hydroxyl groups of a novolac resin, followed by subjecting an allyl halide and the epoxy-added novolac resin to dehyrohalegenation to allyl-etherify the residual hydroxyl groups of the novolac resin and a (III) a method comprising subjecting a novolac resin, an allyl halide and an epoxy compound to reaction to simultaneously effect dehydrohalogenation between some of the hydroxyl groups of the novolac resin and the allyl-halide and addition of the epoxy compound to the residual hydroxyl groups of the novolac resin As the compound having one or more epoxy group(s) in one molecule, an epoxidized compound of phenols, alcohols, glycidyl ethers of nitrogen-containing compound and the like, gllcidyl esters of carboxylic acid, peroxide of olefines and the like can be used. Particularly, the epoxy compound having olefin double-bond(s) such as allyl-glycidyl ether, vinyl-phenyl glycidyl ether, isopropenyl-phenyl glycidyl ether, propenyl-phenyl glycidyl ether, allylphenyl glycidyl ether, propenyl-methoxyphenyl glycidyl ether, allyl-methoxyphenyl glycidyl ether, isopropenyl-methoxyphenyl glycidyl ether, and the like can be preferably used.

The ratio of the epoxy-added hydroxyl groups to the allyl-etherifed hydroxyl groups should be preferably 1:0.5 to 19, and more preferably 1:0.7 to 9.

If the proportion of the allyl-etherified hydroxyl groups is higher than above, adhesive property is deteriorated. If it is smaller than above, heat resistance is deteriorated.

The polymaleimide compound (B) having two or more maleimide groups, used in this invention, has two or more maleimide groups represented by general formula (I) in one molecule:

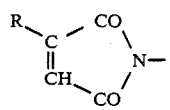 (I)

wherein R represents hydrogen atom or lower alkyl group having 1 to 5 carbon atom(s).

Its concrete examples include N,N'-bismaleimide compounds such as N,N'-diphenylmethane-bismaleimide, N,N'-phenylenebismaleimide, N,N'-diphenyletherbismaleimide N,N'-diphenyl-sulfone-bismaleimide, N,N'-dicyclohexylmethane-bismaleimide, N,N'-xylene-bismaleimide, N,N'-tolylene-bismaleimide, N,N'-xylylenebismaleimide, N,N'-diphenylcyclohexane-bismaleimide, N,N'-dichlorodiphenylmethane-bismaleimide, N,N'-diphenylmethanebismethylmaleimide, N,N'-diphenyl ether bismethylmaleimide, N,N'-diphenyl sulfone bismethylmaleimide (including isomers), N,N'-ethylenebismaleimide, N,N'-hexamethylenebismaleimide and N,N'-hexamethylenebismethylmaleimide; prepolymers having N,N'-bismaleimide skeletons on their molecular ends which can be obtained by adding a diamine compound to the above-mentioned N,N'-bismaleimide compounds; and maleimide and methyl maleimide derivatives of aniline-formaldehyde polycondensate. Among them, N,N'-diphenylmethanebismaleimide and N,N'-diphenyl ether bismaleimide are particularly preferable.

In the resin composition of this invention, the quantitative ratio of the ingredients may vary depending on the use and object such as heat resistance, but generally it is preferably so controlled that the ratio of double bonds of the polymaleimide compound (B) to double bonds of the allyl-etherific phenol novolac resin (A) comes to 0.5 to 3.0. In this invention, the ingredients may be previously reacted to such as extent as to cause no gelation.

The resin composition of this invention can easily be cured by heat. The cure can be accelerated by adding a radical polymerization initiator such as azo compound, organic peroxide and the like or an ionic catalyst such as tertiary amine, quaternary ammonium salt, imidazole compound, boron trifluoride, amine salt thereof and the like.

The resin composition of this invention can be made into a casting material or a molding material by compounding it with various fillers and reinforcing materials at a relatively low temperature by means of mixer, kneader, roll or the like. Further, the resin composition of this invention can also be used as a laminating material by melting it or dissolving it into a solvent followed by coating it on various reinforcing fibers such as glass fiber, carbon fiber and the like. And it can be added another kind of thermosetting resin such as another kind of allyl resin, epoxy resin, unsaturated polyester resin, phenol resin, silicone resin, triazine resin and the like.

The resin composition in this invention exhibits excellent processability, heat resistant, adhesive property, water-resistant and electrical insulation property and it can be used to make thermosetting resin extremely useful as materials for casting, impregnation, lamination and molding.

Next, referring to the following non-limitative referential examples and examples, the invention will be illustrated in more detail. In the examples, "parts" means "parts by weight".

REFERENTIAL EXAMPLE 1

(Allyl-etherification)

Into a reactor equipped with a thermometer, a stirrer, a dropping funnel and a reflux condenser, 236 parts (2 equivalents) of o-cresol novolac resin having a softening point of 90° C. and 840 parts of dimethylformamide, as a reaction solvent, were charged. After the resin had completely dissolved, 41 parts (1.0 equivalent) of 97% solution of sodium hydroxide was added and thoroughly stirred. Then, 82 parts (1.08 equivalents) of allyl chloride was dropwise added over a period of one hour while keeping the system temperature at 40° C. Then, the reaction system was heated to 50° C. and kept at this temperature for five hours. After distilling off the dimethylformamide, 300 parts of toluene was charged and the resin was dissolved thereinto, after which the inorganic salt was removed by washing with water and filtration and the filtrate was concentrated. Thus, 262 parts of a red-orange colored semi-solid resin having no nucleus-substituting allyl group was obtained. Degree of allyl-etherification 50%; OH equivalent 276 g/eq.

(Epoxy compound addition)

Into a reactor equipped with a thermometer, a stirrer, a dropping funnel and a reflux condenser 220.8 parts (0.8 equivalent) of the allyl-etherified product obtained above, 94.0 parts (0.81 equivalent) of allylglycidyl ether having an epoxy equivalent of 116 g/eq and 730 parts of acetonitrile as a reaction solvent were charged. After the resin had completely dissolved, 6.7 parts (0.08 equivalent) of 48% solution of sodium hydroxide was added, and kept the reaction temperature at 80° C. for twelve hours.

After neutralization with phosphoric acid and distilling off acetonitrile, 730 parts of toluene was charged and the resin was dissolved thereinto. After which the inorganic salt was removed by washing with water and filtration and filtrate was concentrated. Thus 308 parts of a brown colored viscous liquid resin having a double bond equivalent of 196 g/eq are obtained. This product was named "ALE-1".

REFERENTIAL EXAMPLE 2

The procedure of Referential Example 1 was repeated, except that the allyl-glycidyl ether was replaced with 158 parts (0.81 equivalent) of m-isopro- penylphenyl-glycidyl ether having an epoxy equivalent of 195 g/eq. As the result, 370 parts of brown colored semi-solid resin having double bond equivalent of 235 g/eq was obtained. This product was named "ALE-2".

REFERENTIAL EXAMPLE 3

(Allyl-etherification)

The procedure of Referential Example 1 was repeated, except that 62 parts (1.5 equivalents) of 97% sodium hydroxide and 120 parts (1.58 equivalents) of allyl chloride were used. As the result, 282 parts of a red-orange colored viscous liquid resin having no nucleus-substituting allyl group was obtained. Degree allyl-etherification 75%; OH equivalent 592 g/eq.

(Epoxy compound addition)

The procedure of Referential Example 1 was repeated, except 236.8 parts (0.4 equivalent) of allyletherified product obtained above and allyl-glycidyl ether were replaced with 30.8 parts (0.41 equivalent) of glycidol having epoxy equivalent of 75 g/eq. As the result 262 parts of brown colored viscous liquid resin having double bond equivalent of 223 g/eq was obtained. This product was named "ALE-3".

EXAMPLE 1

Into 642 parts of N,N-dimethylformamide (DMF) were dissolved 200 parts of ALE-1 obtained in Referential Example 1 and 228 parts of N,N'-diphenylmethane bismaleimide. The resulting solution was impregnated into glass cloth (KS-1600, A-1100, manufactured by Kanebo K.K.). Then it was treated in an oven at 180° C. for 10 minutes to form a prepreg. Six sheets of the prepreg were superposed, molded in a press at 180° C. under a pressure of 50 kg/cm$^2$ for 60 minutes and then post-cured in an oven at 180° C. for 2 days to form a laminate. Similarly, a copper-lined laminate having a thickness of 1 mm was prepared from six sheets of the prepreg and a copper foil (manufactured by Furukawa Circuit Foil K.K., TAI-treated, 35 microns in thickness). Properties of the laminates were as shown in Table 1.

EXAMPLE 2

Into 585 parts of DMF were dissolved 200 parts of ALE-2 obtained in Referential Example 2 and 190 parts of N,N'-diphenylmethane bismaleimide, after which the procedure of Example 1 was repeated to obtain a laminate and a copper-lined laminate. Their properties were as shown in Table 1.

EXAMPLE 3

Into 660 parts of DMF were dissolved 200 parts of ALE-3 obtained in Referential Example 3 and 240 parts of N,N'-diphenylmethane bismaleimide, after which the procedure of Example 1 was repeated to obtain a laminate and a copper-lined laminate. Their properties were as shown in Table 1.

COMPARATIVE EXAMPLE 1

A mixture consisting of 179 parts of N,N'-diphenylmethane bismaleimide and 37 parts of 4,4'-diaminodiphenylmethane was stirred at 180° C. for 5 minutes. Then, 320 parts of DMF was added to prepare a uniform solution. Using the solution, a laminate and a copperlined laminate were prepared in the same manner as in Example 1. Their properties were as shown in Table 1.

TABLE 1

|  |  | Example 1 | Example 2 | Example 3 | Comparative Example 1 |
| --- | --- | --- | --- | --- | --- |
| Tg | °C. | 256 | 260 | 225 | 220 |
| Water absorption (boiling for 48 hrs.) | % | 1.23 | 1.00 | 1.51 | 1.57 |
| Volume resistivity (ordinary state) | Ωm | 1.4 × 10$^{16}$ | 1.6 × 10$^{16}$ | 9.8 × 10$^{15}$ | 7.6 × 10$^{15}$ |
| Ditto (after boiling for 48 hrs.) | Ωm | 3.3 × 10$^{14}$ | 3.8 × 10$^{14}$ | 1.4 × 10$^{14}$ | 1.1 × 10$^{14}$ |
| Peeling strength | Kg/m | 151 | 146 | 155 | 140 |

As is apparent from Table 1, the composition of this invention gives a cured product having excellent heat resistance, water resistance, electrical insulating property and adhesive property. Further, the composition of the invention is excellent in solubility in solvents and so excellent in processability as to cure at a temperature of about 180° C.

What is claimed is:

1. A thermosetting resin composition comprising (A) a phenol novolac resin, some of the hydroxyl groups of which have been allyl-etherified and the other hydroxyl groups have added thereto a compound having one or more epoxy groups and (B) a polymaleimide compound having two or more maleimide groups in the molecule.

2. A thermosetting resin composition according to claim 1, wherein said polymaleimide compound is a compound having two or more maleimide groups represented by the following general formula (I) in one molecule:

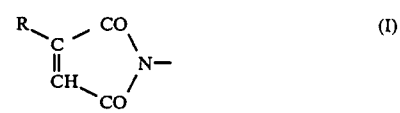

wherein R represents hydrogen atom or lower alkyl group having 1 to 5 carbon atoms.

3. A thermosetting resin composition according to claim 2, wherein said polymaleimide compound is N,N'-diphenylmethane bismaleimide or N,N'-diphenyl ether bismaleimide.

4. A thermosetting resin composition according to claim 1, wherein said compound having one or more epoxy group(s) in one molecule is an epoxy compound having olefinic double bond(s).

5. A thermosetting resin composition according to claim 1, wherein, in the novolac resin, the ratio of the allyl-etherified hydroxyl groups to the hydroxyl groups being added with compound(s) having one or more epoxy group(s) in one molecule is in the range of 0.5 to 19.

6. A thermosetting resin composition according to claim 1, wherein, in the novolac resin, the ratio of the allyl-etherified hydroxyl groups to the hydroxyl groups being added with compound(s) having one or more epoxy group(s) in one molecule is in the range of 0.7 to 9.

7. A thermosetting resin composition according to claim 1, wherein the ratio of the double bond of the polymaleimide compound to the double bond of the phenol novolac resin of which phenolic hydroxyl groups are allyl-etherified and are added with a compound having one or more epoxy group(s) in one molecule is in the range of 0.5 to 3.

* * * * *